United States Patent [19]

Schütz et al.

[11] 4,163,602
[45] Aug. 7, 1979

[54] INFRARED PICK-UP DEVICE COMPRISING AN INFRARED SENSITIVE TELEVISION PICK-UP TUBE

[75] Inventors: Klaus Schütz; Holger Helber; Gerhard Lange, all of Bremen, Fed. Rep. of Germany

[73] Assignee: U.S. Philips Corporation, New York, N.Y.

[21] Appl. No.: 874,526

[22] Filed: Feb. 2, 1978

[30] Foreign Application Priority Data

Feb. 5, 1977 [DE] Fed. Rep. of Germany ....... 2704847

[51] Int. Cl.$^2$ ............................................. H04N 5/33
[52] U.S. Cl. .................................. 358/113; 250/333; 250/334; 358/209
[58] Field of Search ...................... 358/113, 213, 209; 250/330, 332, 333, 334, 338

[56] References Cited

U.S. PATENT DOCUMENTS 4,031,393  6/1977  Redman ................. 250/332

Primary Examiner—Robert L. Griffin
Assistant Examiner—Edward L. Coles
Attorney, Agent, or Firm—Marc D. Schechter

[57] ABSTRACT

Infrared pick-up device comprising an infrared sensitive television pick-up tube and a diaphragm, which is alternately in the open and closed state, the amplitude of the available video signal being proportional to the speed at which the temperature changes, an additional, uniform radiation being superimposed on the scene radiation which can be changed so by a signal processing stage connected to the pick-up tube that the quantity of the average scene radiation plus the superimposed additional radiation is substantially equal to the radiation coming from the diaphragm in the closed state and acting on the target plate of the pick-up tube.

3 Claims, 1 Drawing Figure

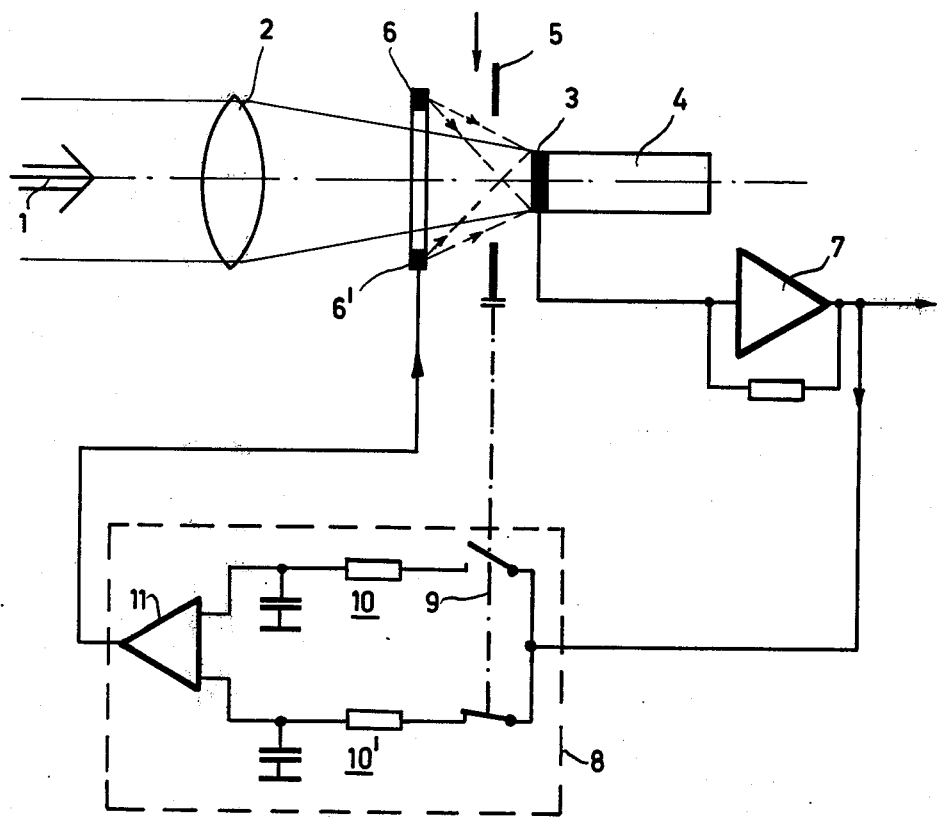

INFRARED PICK-UP DEVICE COMPRISING AN INFRARED SENSITIVE TELEVISION PICK-UP TUBE

The invention relates to an infrared pick-up device comprising an infrared-sensitive television pick-up tube and, arranged in the beam path for the pick-up tube a diaphragm which is alternatively in the open and closed state, the amplitude of the available video signal being proportional to the speed at which the temperature changes.

Temperature changes on the target plate of the pyroelectric pick-up tube are caused by intensity modulation of the incoming infrared radiation, for example, by means of a rotating diaphragm (chopper) arranged in the optical beam path, this diaphragm having alternating transparent and opaque areas, as disclosed in German Pat. Spec. No. 1,772,465.

A drawback is that the radiation acting on the target plate alternately comes from the scene and from the rotating diaphragm and that at the temperature differences which are substantially always present between scene and diaphragm, signal jumps without information occur in the video signal. These signals resulting from the system often exceed by far the signals originating from a thermal scene and must be suppressed for the display of the picture.

Either the temperature of the rotating diaphragm can be measured or the rotating diaphragm can be kept at a constant temperature and, by means of a correction signal corresponding to the temperature of the diaphragm, the difference between the scene temperature and the diaphragm temperature can be electrically compensated in the video signal.

This, however, has the drawback that the above-mentioned temperature and signal jumps respectively can only be compensated in an incomplete manner, owing to the local inequalities in the radiation sensitivity of the target plate of the pick-up tube.

It is an object of the invention to provide a device of the above-mentioned type which does not have said drawbacks, with which the temperature difference can already be compensated for on the target plate of the pick-up tube.

In accordance with the invention the infrared pick-up device is characterized in that a uniform infrared radiation, obtained from an additional infrared radiator is superimposed on the scene radiation the infrared radiator being connected for control to a signal processing stage connected to the output of the pick-up tube, so that the quantity of the average scene radiation plus the superimposed additional radiation is substantially equal to the radiation coming from the diaphragm in the closed state and on the target plate of the pick-up tube.

In this manner temperature and signal transients on the target plate of the pick-up tube are suppressed in a simple manner.

Furthermore, inertia effects are reduced and the dynamic range is increased. The compensation is independent of the local inequalities in the radiation sensitivity of the pick-up tube. In addition, devices for measuring the diaphragm temperature or the necessity of keeping the diaphragm at a constant temperature are no longer necessary.

The drawing shows schematically an arrangement of an embodiment.

Infrared radiation 1 originating from a scene is displayed by an optical system 2 on a radiation sensitive target plate 3 of a pick-up tube 4. The scene radiation 1 is periodically interrupted by, for example, a rotating diaphragm 5 (chopper) which has alternating transparent and opaque areas. It might also be possible to use a different type of a diaphragm which could be alternatively adjusted to the open or closed state instead of a rotating diaphragm 5. An additional infrared radiator (6, 6') provided symmetrically relative to the target plate 3 before the rotating diaphragm irradiates the target plate 3 simultaneously with the scene radiation 1 and that with a quantity which is derived from a signal processing stage comprising a fedback operational amplifier 7 and a switching circuit 8, for controlling the temperature of the additional radiator (6, 6'), which results in that irrespective of the fact whether the rotation diaphragm 5 is in the open or the closed state, a uniform average quantity of radiation is supplied to the target plate 3.

The switching circuit 8 consists of a change-over switch 9 which, depending on the motion of the rotating diaphragm 5 with an open and closed state respectively, alternately connects integrators 10 and 10' to the operational amplifier 7 so that a signal is supplied via a differential amplifier 11 with which the temperature of the radiators (6, 6') is controlled. When arranged symmetrically, these radiators supply a uniform, additional, controllable infrared radiation for the target plate 3. Optionally, the radiators (6, 6'), which may be in the form of resistors, may be provided with reflectors. If the maximum value is taken as reference instead of the average value of the video signal derived from the target plate, the resistors of the integrators (10, 10') might then be replaced by diodes.

What is claimed is:

1. Infrared pick-up device comprising an infraredsensitive television pick-up tube and, arranged in the beam path for the pick-tube, a diaphragm which is alternately in the open and closed state, the amplitude of the available video signal being proportional to the speed at which the temperature changes, an infra-red radiator in the beam path for superimposing a uniform level of infrared radiation on the scene radiation, signal processing means connected to the output of the pick-up tube and the infra-red radiator for controlling the quantity of radiation produced by said infra-red radiator so that the quantity of the average scene radiation plus the superimposed additional radiation is substantially equal to the radiation coming from the diaphragm in the closed state and acting on the target plate of the pick-up tube.

2. Infrared pick-up device as claimed in claim 1, wherein the signal processing stage comprises a switching circuit having a changeover switch, controlled by the open and closed state respectively of the diaphragm, for two integrators to which two inputs of a differential amplifier are connected for controlling the temperature of the additional infrared radiator.

3. Infrared pick-up device as claimed in claim 2, wherein the additional radiator consists of infrared radiators which are arranged symmetrically before the diaphragm relative to the target plate, the temperature of these infrared radiators being adjustable.

* * * * *

UNITED STATES PATENT OFFICE
CERTIFICATE OF CORRECTION

Patent No. 4,163,602                     Dated August 7, 1979

Inventor(s)   KLAUS SCHUTZ et al

It is certified that error appears in the above-identified patent and that said Letters Patent are hereby corrected as shown below:

Change Title to read -- INFRARED PICK-UP DEVICE COMPRISING AN INFRARED-SENSITIVE TELEVISION PICK-UP TUBE --

Col. 2, line 39, After "comprising an" delete "infraredsen-" and insert -- infrared-sensitive--

Col 2, line 40, Before "television" delete "sitive"

Signed and Sealed this

Thirteenth Day of January 1981

[SEAL]

Attest:

SIDNEY A. DIAMOND

Attesting Officer         Commissioner of Patents and Trademarks